(12) United States Patent
Kang

(10) Patent No.: US 10,133,680 B2
(45) Date of Patent: *Nov. 20, 2018

(54) DATA STORAGE APPARATUS, CODING UNIT, SYSTEMS INCLUDING THE SAME, METHOD OF CODING AND METHOD OF READING DATA

(71) Applicant: Samsung Electronics Co., Ltd., Suwon-si, Gyeonggi-do (KR)

(72) Inventor: Dong-Ku Kang, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 74 days.

This patent is subject to a terminal disclaimer.

(21) Appl. No.: 15/183,319

(22) Filed: Jun. 15, 2016

(65) Prior Publication Data

US 2017/0017582 A1 Jan. 19, 2017

Related U.S. Application Data

(62) Division of application No. 13/445,197, filed on Apr. 12, 2012, now Pat. No. 9,373,005.

(30) Foreign Application Priority Data

May 17, 2011 (KR) .................. 10-2011-0046405
Aug. 16, 2011 (KR) .................. 10-2011-0081308

(51) Int. Cl.
*G06F 11/00* (2006.01)
*G06F 12/14* (2006.01)
(Continued)

(52) U.S. Cl.
CPC .......... *G06F 12/1408* (2013.01); *G06F 21/71* (2013.01); *G06F 21/74* (2013.01);
(Continued)

(58) Field of Classification Search
CPC .. G06F 21/71; G06F 21/74; G06F 2221/2105; G06F 2221/2111
See application file for complete search history.

(56) References Cited

U.S. PATENT DOCUMENTS 6,549,446 B2   4/2003   Morley et al.
6,598,166 B1   7/2003   Folmsbee
(Continued)

FOREIGN PATENT DOCUMENTS

JP   2001156772 A   6/2001
JP   2004070049 A   3/2004
(Continued)

OTHER PUBLICATIONS

Japanese Office Action dated Jan. 16, 2018 issued in corresponding Japanese Application No. 2016-216495 (no English translation).

*Primary Examiner* — Sam Rizk
(74) *Attorney, Agent, or Firm* — Harness, Dickey & Pierce, P.L.C.

(57) ABSTRACT

In one embodiment, the data storage apparatus includes a control unit configured to decode at least one input command and configured to generate at least one of a read signal and a start signal in response to the input command. The start signal indicates to start an internal mode determination process. The data storage apparatus also includes a memory unit configured to output data in response to the read signal, and a coding unit configured to start and perform the internal mode determination process in response to the start signal. The internal mode determination process includes autonomously determining a coding mode, and the coding unit is configured to code the output data based on the determined coding mode to produce coded data.

20 Claims, 19 Drawing Sheets

(51) Int. Cl.
*G06F 21/71* (2013.01)
*G06F 21/74* (2013.01)

(52) U.S. Cl.
CPC ........ *G06F 2212/1052* (2013.01); *G06F 2212/402* (2013.01); *G06F 2221/2105* (2013.01); *G06F 2221/2111* (2013.01)

(56) References Cited

U.S. PATENT DOCUMENTS

| | | |
|---|---|---|
| 7,770,027 B2 | 8/2010 | Umezu et al. |
| 7,967,680 B2 | 6/2011 | Yamada et al. |
| 2003/0226029 A1 | 12/2003 | Porter et al. |
| 2006/0107072 A1 | 5/2006 | Umezu et al. |
| 2010/0142453 A1* | 6/2010 | Harada ............ H04W 72/1273 370/329 |

FOREIGN PATENT DOCUMENTS

| | | |
|---|---|---|
| JP | 2006139884 A | 6/2006 |
| JP | 2007-190069 A | 8/2007 |
| JP | 2010-252084 A | 11/2010 |

\* cited by examiner

|  | RATIO OF CORRECTABLE CODING |
|---|---|
| CODING POLICY 1 | 40% |
| CODING POLICY 2 | 50% |
| CODING POLICY 3 | 60% |
| CODING POLICY 4 | 70% |
| ⋮ |  |

DATA STORAGE APPARATUS, CODING UNIT, SYSTEMS INCLUDING THE SAME, METHOD OF CODING AND METHOD OF READING DATA

CROSS-REFERENCE TO RELATED APPLICATION

This application is a divisional application of U.S. application Ser. No. 13/445,197, filed Apr. 12, 2012, which claims priority from Korean Patent Application Nos. 10-2011-0046405 and 10-2011-0081308 filed on May 17, 2011 and Aug. 16, 2011, respectively, in the Korean Intellectual Property Office, and all the benefits accruing therefrom under 35 U.S.C. 119, the contents of each of which are hereby incorporated by reference in their entirety.

BACKGROUND

1. Field of the Invention

Embodiments relate to a data storage apparatus and system for outputting coded data, and more particularly, to a data storage apparatus and system for—coding data to be outputted and randomly varying a coding mode applied to each of fragments of the data, thereby providing enhanced data security.

2. Description of the Related Art

Various data storage apparatuses for storing digital data are being provided. For example, there are a hard disk drive, a solid state drive (SSD) and various memory cards. In order to prevent an unauthorized person from reading the digital data stored in the data storage apparatus, the data storage apparatus requires enhanced data security technology for coding and outputting data stored in a security region to make difficult, perhaps impossible to decode the data even when data is read.

SUMMARY

At least one example embodiment relates to a data storage apparatus.

In one embodiment, the data storage apparatus includes a control unit configured to decode at least one input command and configured to generate at least one of a read signal and a start signal in response to the input command. The start signal indicates to start an internal mode determination process. The data storage apparatus also includes a memory unit configured to output data in response to the read signal, and a coding unit configured to start and perform the internal mode determination process in response to the start signal. The internal mode determination process includes autonomously determining a coding mode, and the coding unit is configured to code the output data based on the determined coding mode to produce coded data.

In another embodiment, the data storage apparatus includes a control unit configured to decode an input command and configured to generate at least one of a read signal and a trigger signal in response to the input command. The input command does not indicate a coding mode. The data storage apparatus also includes a memory unit configured to output data in response to the read signal and a coding unit configured to generate indication data in response to the trigger signal. The indication data indicates a coding mode. The coding unit is configured to select the coding mode from a set of coding modes based on the indication data, and is configured to code the output data based on the determined coding mode.

In a further embodiment, the data storage apparatus includes a control unit configured to decode an input command and configured to generate at least one of a read signal and a trigger signal in response to the input command. The data storage apparatus further includes a memory unit configured to output data in response to the read signal, and a coding unit configured to generate first random data in response to the trigger signal. The coding unit is configured to autonomously select a coding mode from a set of coding modes based on the first random data, and is configured to code the output data based on the determined coding mode.

At least one embodiment relates to a coding unit.

In one embodiment, the coding unit includes a coding determination unit configured to generate random data having a desired distribution and configured to determine a coding mode according to the random data. A coder in the coding unit is configured to code data based on the determined coding mode.

At least one embodiment also relates to a system including the data storage apparatus and/or the coding unit.

At least one embodiment relates to method of coding data.

In one embodiment, the method includes varying a coding ratio of one or more coding modes based on user input, selecting a coding mode, and coding output data from a memory unit based on the selected coding mode to produce coded data.

In another embodiment, the method includes selecting a coding mode from the plurality of coding modes based on a coding policy. The coding policy indicates a probability of selecting each of a plurality of coding modes. The method further includes coding data according to the selected coding mode to produce coded data.

In a further embodiment, the method includes generating a plurality of sets of coded data fragments. Each set represents same original data, and each set includes a pattern of at least first coded data fragments and second coded data fragments. The first coded data fragments are less coded than the second coded data fragments, and the generating generates the plurality of sets such that the pattern associated with one set may differ from the pattern associated with another set.

At least one embodiment relates to a method of reading data.

In one embodiment, this method includes generating at least one of a read signal and a trigger signal in response to an input command, outputting data from a memory unit in response to the read signal, generating first random data in response to the trigger signal, autonomously selecting a coding mode from a set of coding modes based on the first random data, and coding the output data based on the determined coding mode.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE EMBODIMENTS

Figure 1:
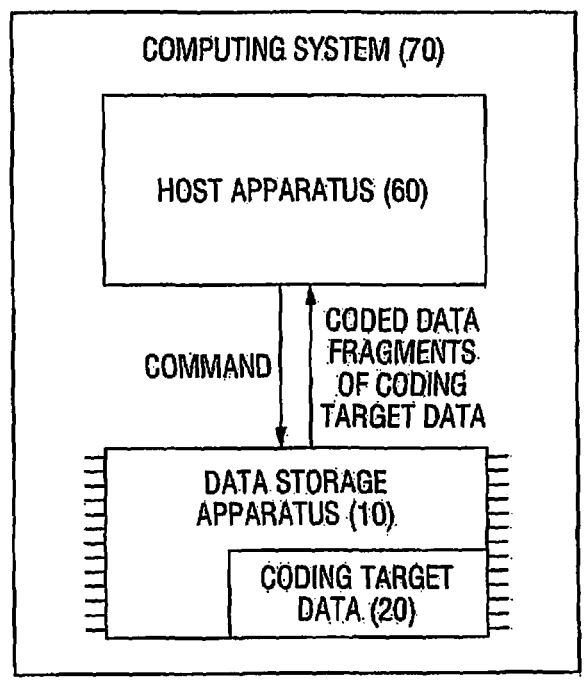
FIG. 1 illustrates a configuration of a computing system including a host apparatus and a data storage apparatus in accordance with an embodiment.

Example embodiments now will be described more fully hereinafter with reference to the accompanying drawings, in which the embodiments are shown. The example embodiment may, however, be embodied in many different forms and should not be construed as limited to those set forth herein. Rather, these embodiments are provided so that this disclosure will be thorough and complete, and will fully convey the scope of the invention to those skilled in the art.

In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", an and the are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

The term "coding" used herein may mean randomizing original data to be converted into noise data, or encrypting original data such that the encrypted data can be corrected by a certain decryption method later. A data storage apparatus in accordance with an embodiment may randomize original data or encrypt original data in response to a command.

In a case where the data storage apparatus converts original data into noise data and outputs the noise data, it is preferable that the original data includes an error correction code to correct the coded data. A well-known code such as Viterbi code and Turbo code may be used as the error correction code.

First, a computing system in accordance with an embodiment will be described with reference to FIG. 1. A computing system 70 in accordance with an embodiment includes a host apparatus 60 and a data storage apparatus 10.

The host apparatus 60 of this embodiment may be a processing apparatus having an operator unit such as a processor. Specifically, the computing system 70 (or a computing system 80 of FIG. 2) including the host apparatus 60 may be a mobile phone, a two-way communication system, a one-way pager, a two-way pager, a personal communication system, a portable computer, a personal data assistant (PDA), an audio and/or video player, a digital and/or video camera, a navigation system, a global positioning system (GPS), or the like.

The data storage apparatus 10 of this embodiment may be a chip or package using, as a storage unit, a nonvolatile memory such as a NAND flash memory, a NOR flash memory, a phase change random access memory (PRAM), a magnetic random access memory (MRAM), a resistive random access memory (RRAM), etc. Hereinafter, the flash memory chip will be described as an example of the data storage apparatus 10.

As shown in FIG. 1, the data storage apparatus 10 may be connected directly to the host apparatus 60 which controls the data storage apparatus 10. The host apparatus 60 of this embodiment, when a read operation for obtaining coding target data 20 is executed, may generate a command and provide the command to the data storage apparatus 10 to perform the read operation of the coding target data 20.

The command may be referred to as a first command for performing a read operation of data, a second command serving as a start signal for determining a coding mode of the data storage apparatus 10, or a third command for simultaneously performing a read operation of data and determining a coding mode and the like, according to functions of the command.

The data storage apparatus 10 autonomously determines a coding mode to be applied when the data is outputted later in response to the input of the second command or the third command. Accordingly, the input of the second or third command is used only as a start signal of an internal coding mode determination process, and a coding mode is not determined as designated by the command.

In other words, the command related to the determination of the coding mode inputted to the data storage apparatus 10 does not directly define or indicate the coding mode of the data storage apparatus 10. Further, whenever the command related to starting the determination of the coding mode is inputted, the data storage apparatus 10 does not necessarily change the coding mode. As described above, since the data storage apparatus 10 autonomously determines the coding mode, even though the data outputted from the data storage apparatus 10 is obtained by hacking, it is difficult to recognize whether the data is correctable data, thereby providing an advantage in security.

The coding mode of the data storage apparatus 10 indicates what percentage of the data outputted from the memory will be coded. For example, as the coding mode of the data storage apparatus 10, there may be two modes, i.e., coding mode A in which 20% of data is coded, and coding mode B in which 70% of data is coded. The data storage apparatus 10 autonomously determines one of the coding mode A and the coding mode B as its own coding mode when the second command or the third command is inputted.

Further, in another embodiment, as the coding mode of the data storage apparatus 10, there may be two modes, i.e., coding mode C in which a bypass is performed without coding data, and coding mode D in which data is coded. The data storage apparatus 10 may autonomously determine one of the coding mode C and the coding mode D as its own coding mode when the second command or the third command is inputted.

In one embodiment, the coding mode of the data storage apparatus 10 may determine which module among a plurality of coding modules having different data coding ratios will be used. In particular, the coding modes of the data storage apparatus 10 may include a coding mode using a coding module for coding data such that the coded data can be corrected by a decoding method in a host, and a coding mode using a coding module for coding data such that the coded data cannot be corrected by the decoding method in the host.

While the data storage apparatus 10 outputs the coding target data, the second command or the third command may be inputted to the data storage apparatus 10 a plurality of times, thereby switching a coding mode of the outputted data. The coding target data 20 may mean all types of digital data, e.g., authentication information such as identification information of the data storage apparatus 10 that is used to authenticate the data storage apparatus 10.

A method in which the host apparatus 60 provides a command for coding the data to the data storage apparatus 10 will be described.

First, there will be described a method for dividing the coding target data 20 into two or more fragments, and randomly switching a coding mode applied to each of the fragments whenever the coding target data 20 is outputted.

The host apparatus 60 may alternately generate the first command and the second command for outputting fragments of the coding target data 20.

Upon receipt of the first command, the data storage apparatus 10 codes and outputs a part of the coding target data 20 according to the coding mode determined in response to the second command. In response to the input of the second command, the data storage apparatus 10 generates mode determination data (for mode determination), and determines a coding mode for coding the data to be outputted later based on the mode determination data. The data storage apparatus 10 may generate random data as the mode determination data, and the random data may be generated by a random data generator capable of setting a probability of creating a specific value.

The operation of the data storage apparatus 10 having received the first command and the second command will be described later with reference to FIGS. 14 to 18.

Next, the host apparatus 60 may generate the third command two or more times sequentially for outputting fragments of the coding target data 20. In response to the input of the third command, the data storage apparatus 10 generates mode determination data, and codes and outputs a part of the coding target data 20 according to the coding mode determined based on the mode determination data. The amount of data outputted when the third command is inputted once may be determined by an address included in the third command or may be predetermined by connection with a host. The operation of the data storage apparatus 10 having received the third command will be also described later with reference to FIGS. 19 and 20.

The fragments of the coding target data 20 outputted from the data storage apparatus 10 upon receipt of the first command and the second command, or upon receipt of the third command may have the same data. In other words, the coding target data 20 may be formed by connecting a plurality of the same data fragments. The data storage apparatus 10 may code and output each of the data fragments one by one upon receipt of the first command and the second command, or upon receipt of the third command. In this case, the data fragments outputted whenever the first command and the second command are input, or the third command is inputted may be different according to the coding mode.

Next, there will be described a method in which the data storage apparatus 10 repeatedly outputs the coding target data 20.

The data storage apparatus 10 outputs the coding target data 20 in response to the first command or the third command. In case of receiving the first command, it is preferable that the data storage apparatus 10 receives the second command such that the coding mode can be randomly switched before outputting the coding target data 20.

The data storage apparatus 10 which repeatedly outputs the coding target data 20 is configured to output different data whenever data is outputted in spite of outputting data stored at the same address. Accordingly, there is an effect of preventing the output data from being corrected unfairly.

Hereinafter, unless particularly mentioned, the data storage apparatus 10 is configured to divide the coding target data 20 into data fragments and output the data fragments.

A computing system in accordance with another embodiment will be described with reference to FIG. 2. A computing system 80 of this embodiment may include the host apparatus 60, a controller 40 and the data storage apparatus 10. The data storage apparatus 10 of this embodiment may be electrically connected to the controller 40 controlling the data storage apparatus 10. Further, the controller 40 may be connected to the host apparatus 60. That is, the data storage apparatus 10 may be operated under control of the host apparatus 60 via the controller 40.

The host apparatus 60, when a read operation of the coding target data is executed, may provide one read request to the controller 40, or provide two or more read requests for fragments of the coding target data to the controller 40.

In a case where the host apparatus 60 provides a plurality of read requests for data fragments, the controller 40 transmits the read requests to the data storage apparatus 10. That is, the controller 40 generates the third command in response to the read requests, and provides the third command to the data storage apparatus 10. In response to the input of the third command, the data storage apparatus 10 generates the mode determination data, and codes and outputs a part of the coding target data 20 according to the coding mode determined based on the mode determination data. The output data may be provided to the host apparatus 60 via the controller 40.

In a case where the host apparatus 60 provides one read request to the controller 40 when the read operation is executed, the controller 40 having received the read request may generate the third command two or more times sequentially for outputting fragments of the coding target data 20, or may alternately generate the second command and the first command for outputting fragments of the coding target data 20. In this case, in response to the input of the third command, the data storage apparatus 10 generates the mode determination data, and codes and outputs a part of the coding target data 20 according to the coding mode determined based on the mode determination data. Further, upon receipt of the first command, the data storage apparatus 10 codes and outputs a part of the coding target data according to the coding mode determined based on the mode determination data generated in response to the second command.

Figure 2:
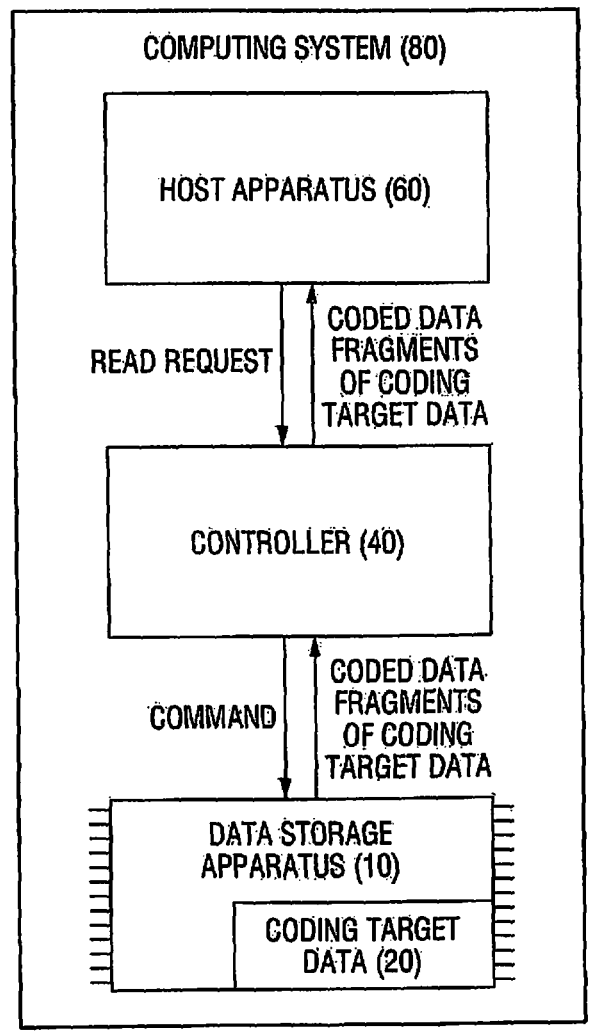
FIG. 2 illustrates a configuration of a computing system including a host apparatus and a data storage apparatus in accordance with an embodiment.

The data storage apparatus 10 shown in FIGS. 1 to 2 may receive the first command and the second command, or the third commands, through input/output (I/O) terminals (pins or balls (not shown)) provided in the data storage apparatus 10. There may be various input/output terminals according to functions, e.g., I/O terminals through which input/output data is transmitted and received, a command latch terminal and an address latch terminal for recognizing whether the data inputted through the I/O terminals is a command or an address, and a read enablement terminal and a write enablement terminal for determining input/output timing through the I/O terminals and the like.

Specifically, data for identifying a command is inputted through the I/O terminals provided in the data storage apparatus 10. In order to determine that the data inputted through the I/O terminals is a command, an appropriate signal may be applied through the command latch terminal and the address latch terminal. At the same time, an appropriate signal may be applied through the write enablement terminal for determining input timing through the I/O terminals. In this regard, a detailed description will be given later with reference to FIG. 16.

The first command or the third command may include address related information. In this case, the data storage apparatus 10 may output the data corresponding to the address included in the first command or the third command.

Figure 3:
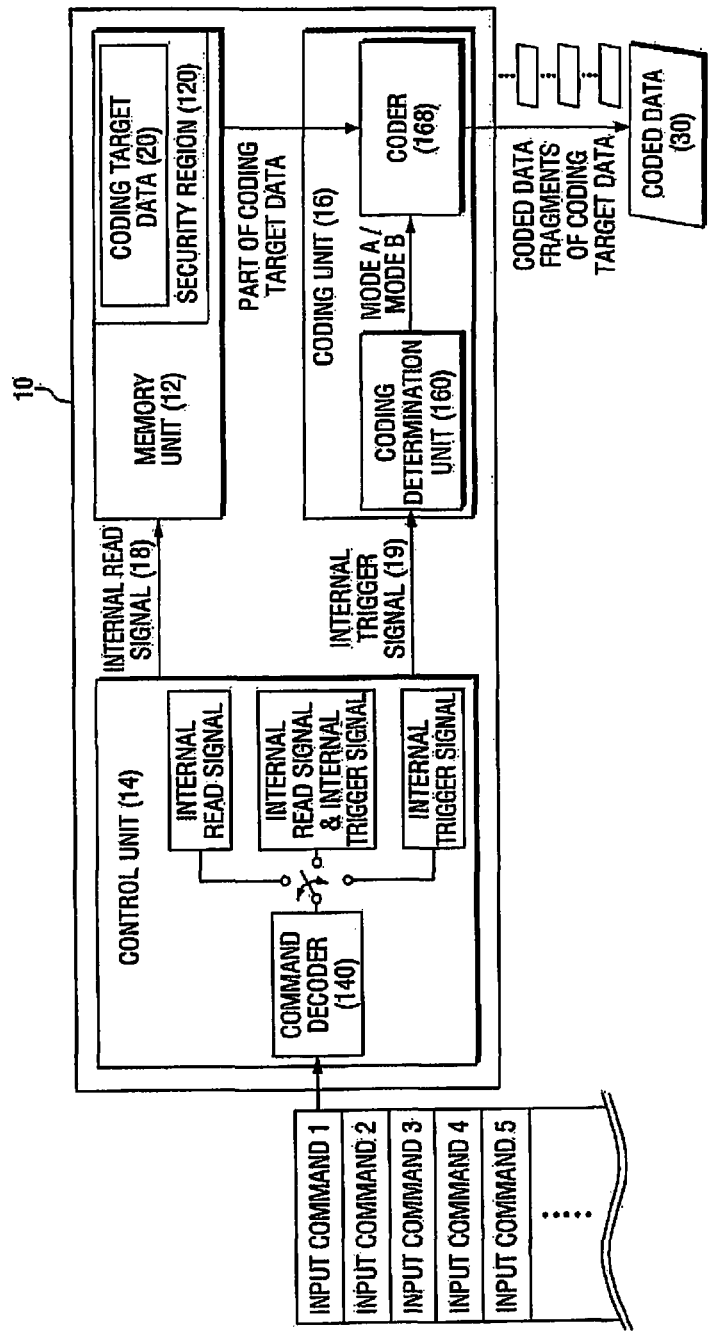
FIG. 3 illustrates a block diagram of the data storage apparatus, input commands and output data in accordance with an embodiment.

The configuration and operation of the data storage apparatus 10 in accordance with the embodiment will be described in detail with reference to FIG. 3. As shown in FIG. 3, the data storage apparatus 10 may include a memory unit 12, a control unit 14, and a coding unit 16.

The control unit 14 decodes the input command and provides at least one of an internal read signal 18 and an internal trigger signal 19 according to the decoding results. The control unit 14 includes a command decoder 140 for decoding the input command, and may output only the internal read signal 18, output both the internal read signal 18 and the internal trigger signal 19, or output only the internal trigger signal 19. Herein, a command for outputting only the internal read signal 18 is referred to as the first command, a command for outputting only the internal trigger signal 19 is referred to as the second command, and a command for outputting both the internal read signal 18 and the internal trigger signal 19 is referred to as the third command.

In response to the internal read signal 18, the memory unit 12 outputs a part of the coding target data 20. The data storage apparatus 10 may output the part or fragments of the coding target data 20 two or more times and switch the coding mode of the coding unit 16 one or more times while outputting the data fragments.

The memory unit 12 receives the internal read signal 18 from the control unit 14 and outputs a part of the coding target data 20 to the coding unit 16.

The memory unit 12 may be configured as a cell array including flash memory cells. The cell array may include various types of memory cells. For example, the cell array may include NAND flash memory cells or NOR flash memory cells, or may include both NAND flash memory cells and NOR flash memory cells.

The cell array of the memory unit 12 may be formed two-dimensionally or three-dimensionally.

The number of bits of data stored in each memory cell of the memory unit 12 may be varied. For example, the memory unit 12 may include single-level flash memory cells (SLC), each cell storing one bit of data, or multi-level flash memory cells (MLC), each cell storing a plurality of bits of data. Further, the memory unit 12 may include both the single-level flash memory cells and the multi-level flash memory cells.

Figures 6, 7:
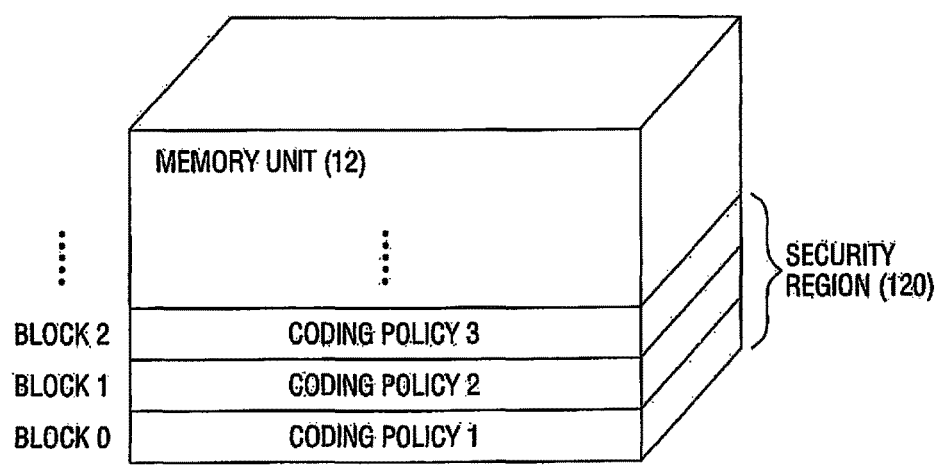
FIG. 6 illustrates a coding policy list used in the data storage apparatus in accordance with an embodiment.
FIG. 7 explains a configuration example of a storage region of a memory unit in accordance with an embodiment.

A security region 120 for storing the coding target data 20 may be allocated in the memory unit 12. The security region 120 may be allocated to a specific address region, and the address region may be allocated to a specific block in the cell array. An example of allocation of the security region, wherein the security region is allocated to block 0 to block 2 is illustrated in FIG. 7.

In a case where the data stored in a region other than the security region 120 is provided from the memory unit 12, the coding process 16 may output the data provided from memory unit 12 to bypass the coding unit even in an on-state of the coding mode. Accordingly, even though a command for requesting the coding of the data stored in a region other than the security region 120 is inputted, the coding unit 16 may not perform data coding.

The security region 120 in which the coding target data 20 is stored may be formed of single-level cells (SLC), and a general region excluding the security region 120 may be formed of multi-level cells (MLC).

Further, the security region 120 may include a plurality of sections. Different coding policies may be applied to the data stored in the respective sections. As shown in FIG. 7, for example, coding policy 1 may be applied to the data stored in block 0, coding policy 2 may be applied to the data stored in block 1, and coding policy 3 may be applied to the data stored in block 2. Accordingly, if the command received by the control unit 14 does not indicate a coding policy, the control unit 14 may provide a coding policy change signal to the coding unit 16 such that the coding policy corresponding to the block storing the coding target data 20 is applied. For example, in the configuration of the memory unit 12 shown in FIG. 7, if the coding target data 20 is stored in block 2, the control unit 14 may provide the coding policy change signal to apply the coding policy 3 to the coding unit 16. The operation of the coding unit 16 that has received the coding policy change signal will be described in detail later.

The coding policy determines a ratio at which a specific coding mode is applied. For example, in a case where coding mode A is a coding mode in which coded data is non-correctable in the host 60 or the controller 40 and coding mode B is a coding mode in which coded data is correctable in the host 60 or the controller 40, a coding policy in which a ratio of the coding mode B is 70% means that the host or the controller can generally correct seven out of ten of the coded data outputted from the data storage apparatus 10.

The coding unit 16 codes and outputs the data provided from the memory unit 12 according to the coding mode.

The coding mode of the coding unit 16 may internally and autonomously determine the type of a module for coding the data. For example, in a first coding mode, a module for coding 30% of the input data may be used, and in a second coding mode, a module for coding 70% of the input data may be used. Alternatively, in the first coding mode, a module for coding the input data may be used, and in the second coding mode, a module for directly outputting the input data with no coding may be used. That is, the coding mode of the coding unit 16 may mean a coding ratio of the input data.

The coding unit 16 may autonomously determine the coding mode in response to the internal trigger signal 19. The internal trigger signal 19 also does not indicating the coding mode. More specifically, when receiving the internal trigger signal 19, the coding unit 16 generates the mode determination data using the internal trigger signal 19 as a start signal. Further, the coding unit 16 determines a coding mode for coding the data provided from the memory unit based on the mode determination data. As described above, the internal trigger signal 19 is only used as a start signal for determining the coding mode of the coding unit 16 and does not directly affect the determination of the coding mode of the coding unit 16.

The coding unit 16 may autonomously determine its own coding mode by a random data generation method. That is, the coding unit 16 may generate first random data as the mode determination data in response to the internal trigger signal 19. However, since the coding target data should be coded to meet a specific coding policy, the coding unit 16 may generate the first random data at a desired (or alternatively a predetermined) probability. For example, a random data generator may be set to randomly generate one of '0' indicating the first coding mode and '1' indicating the second coding mode such that a probability of generating '0' is 70%. In a case where the mode determination data is randomly generated while a probability of generating a specific value is defined, it is possible to meet the coding policy related to a coding ratio of the data while randomly varying a coding output pattern of the coding target data. Namely, because the data pattern of the mode determination data randomly varies according to the coding policy, the coding output pattern does as well.

The coding unit 16 may further generate second random data according to the selected coding mode. The second random data may be used to code the data provided from the memory unit 12. For example, the coding unit 16 logically operates the data from the memory unit 12 with the second random data for coding the data and outputs the coded data. The logical operation may be, for example, an exclusive OR operation, a combination of logical operations, or etc. A plurality of data fragments outputted from coding unit 16 in response to a plurality of the internal read signals can construct coded data 30 of coding target data 20.

The data storage apparatus 10 of this embodiment may vary the coding of the output data according to the coding policy by inputting the second command or the third command two or more times. This will be described in detail with reference to FIG. 4.

Let us suppose that the coding target data 20 is divided into ten fragments to be read, and the third command is inputted to the data storage apparatus 10 ten times at regular intervals. Also, it is supposed that a correctability limit ratio of the host 60 or the controller 40 is 40 percent of coded data. The correctability limit ratio means a maximum coding ratio at which the coded data can be corrected, for example, using the error correction code (ECC).

It is supposed that a coding module for coding 20% of data is used in the coding mode A, and a coding module for coding 80% of data is used in the coding mode B. Namely, the data that is coded and outputted according to the coding mode A is correctable coded data, and the data that is coded and outputted according to the coding mode B is non-correctable coded data—essentially noise data. Further, it is supposed that when the third command is inputted, a probability of selecting the coding mode A is 70% according to the coding policy.

Figure 4:
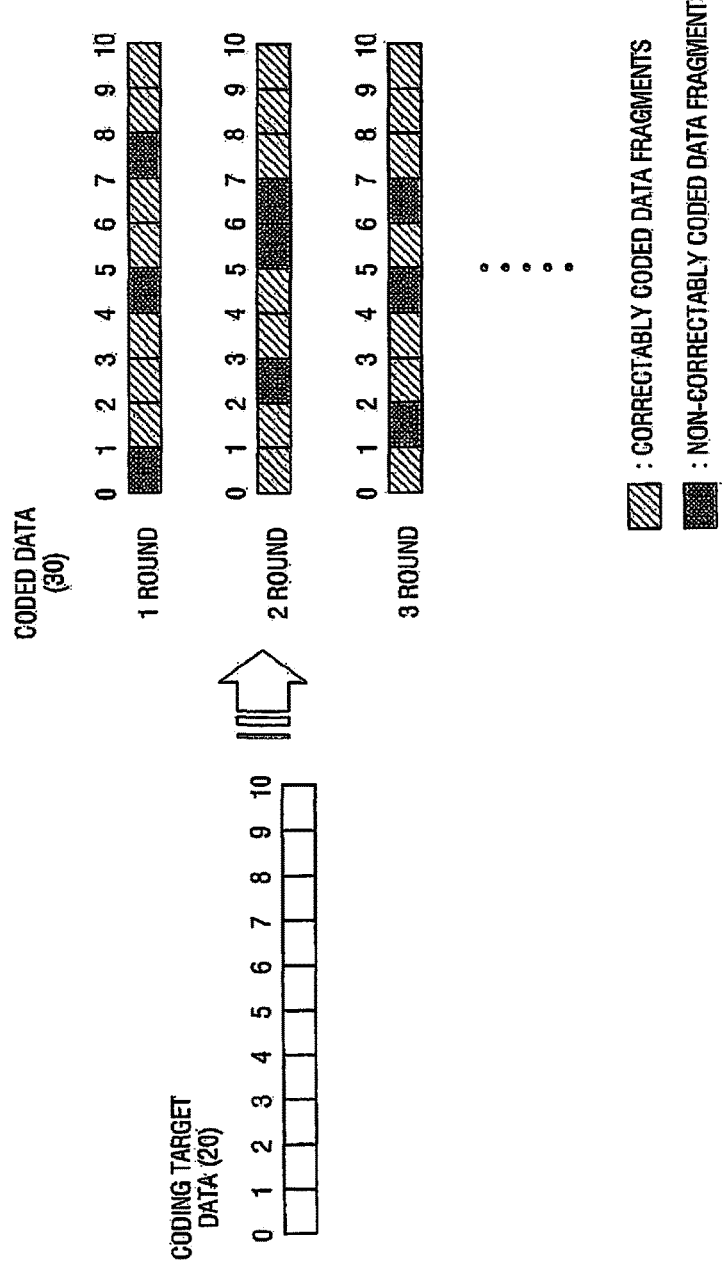
FIG. 4 is a conceptual diagram showing an example in which the data storage apparatus codes and outputs the data in accordance with an embodiment.

In this case, as shown on the right side of FIG. 4, it can be seen that the coding patterns are different in respective rounds, but a probability of outputting the correctable coded data is maintained at 70%. Since the determination of the coding mode depends on the first random data generated in the coding unit 16, a probability of outputting correctable coded data may be slightly different from 70% under the above conditions. However, the difference may be overcome by performing a plurality of rounds. Furthermore, random number generation may be configured such that the correctable coding mode is selected at least once and no more than a maximum number of times. Namely, the number generation produces a data pattern to which the coding pattern corresponds such that the data pattern indicates the correctable coding mode at least once and no more than a maximum number of times. The maximum number may correspond to the coding policy. For example, if the coding policy 70%, then no more than 7 out of 10 fragments is coding according to the correctable coding mode. Stated another way, the data pattern generated to indicate the coding modes is based on the coding policy.

The coding target data 20 shown in FIG. 4 may include the same data in the ten fragments. That is, the coding target data 20 may be formed by connecting two or more fragments having the same data, and the data storage apparatus 10 may output the fragments of the coding target data 20.

In a case where the coding target data 20 is formed by connecting a plurality of fragments having the same data, the data storage apparatus 10 codes and outputs the same data fragment a plurality of times. In this case, the coding policy and the coding mode are determined before the corresponding fragment is outputted, and the data fragment is coded and outputted according to the determined coding mode. The coding patterns of the data fragments may also be different in each round, but a ratio of the correctable coded data fragments in each round may be determined the same.

Alternatively, the data storage apparatus 10 in accordance with an embodiment may store coding target data at the same region accessible by the same address. In this case, the data storage apparatus 10 may receive the third command a plurality of times. The coding target data is coded according to the selected code mode based on the mode determination data generated in the coding unit 16. However, since the coding mode is determined whenever the coding target data is outputted, the data storage apparatus 10 of this embodiment may output different coded data according to the coding mode although the coding target data stored in the same region is outputted.

Referring to FIG. 4 again, the data storage apparatus 10 which outputs the coding target data 20 a plurality of times may receive the same number of commands as the output number of the coding target data 20. For example, if the coding target data 20 is outputted ten times, the data storage apparatus 10 may receive both the first command and the second command ten times or receive the third command ten times.

On the other hand, the data storage apparatus 10 may output the coding target data 20 a plurality of times even when the third command is inputted once. For this operation, the control unit 14 that has received the third command may respectively provide the internal read signal 18 and the internal trigger signal 19 to the memory unit 12 and the coding unit 16 a plurality of times equal to the output number of the coding target data 20 in order to output all of the coding target data 20.

As described above, in the data storage apparatus 10 in accordance with an embodiment, a coding pattern is randomly changed each time while maintaining a probability of outputting the correctable coded data. Accordingly, the data read from the data storage apparatus 10 can be corrected from the coded data while maintaining the security.

The coding unit 16 may have two or more coding modes as explained above. However, to facilitate understanding, a case where the coding unit 16 has two coding modes will be described as an example.

As shown in FIG. 3, the coding unit 16 may include a coder 168, which processes the data provided from the memory unit 12 according to the coding mode, and a coding determination unit 160, which generates the mode determination data in response to the internal trigger signal 19, determines the coding mode based on the mode determination data, and provides a coder control signal for operating the coder 168 in the determined coding mode to the coder 168.

The coding determination unit 160 may provide the coder control signal to the coder 168 whenever it receives the internal trigger signal 19. Alternatively, the coding determination unit 160 may provide the coder control signal for switching the coding mode to the coder 168 when the autonomously determined coding mode is different from the current coding mode of the coder 168. That is, the coding determination unit 160 may provide the coder control signal to the coder 168 only when it is necessary to switch the coding mode of the coder 168. In this case, since the coder 168 receives the control signal a minimum number of times, operation efficiency can be improved.

The configuration and operation of the coding determination unit 160 will be described in detail with reference to FIG. 5. The coding determination unit 160 may include a coding policy list loading unit 164 for loading the data on the coding policy from a coding policy list storage unit 163 after power is applied to the data storage apparatus 10. The coding determination unit 160 also includes a coding mode determining part 161 for autonomously determining the coding mode when the internal trigger signal 19 is inputted, and a coder control signal generator 162 for generating a coder control signal for controlling the coder 168 in the coding mode determined according to the coding mode determining part 161.

The coding policy list loading unit 164 loads the data on the coding policy from the coding policy list storage unit 163. The coding policy list loading unit 164 may perform a loading operation after power is applied to the data storage apparatus 10. Alternatively, the coding policy list loading unit 164 may perform the loading operation in response to a specific command inputted from the host apparatus or the controller after power is applied to the data storage apparatus 10. The coding policy list loading unit 164 may include registers as a volatile storage means to store the loaded data.

The coding policy list in accordance with an embodiment is illustrated in FIG. 6. There may be only one coding policy. There may be two or more coding policies, one of which is selected and applied. In a case where there are two or more coding policies, the data storage apparatus 10 may use the coding policy designated by the controller 40 or the host apparatus 60, or autonomously determine the coding policy.

FIG. 6 illustrates an example in which one of coding policies is selected and used. For example, in a case where coding policy 1 is selected, a ratio of the correctable coding is 40%. If the coding determination unit 160 receives the internal trigger signal 19 ten times, a coding module for correctable coding the data may be selected about four times.

In order to change the coding policy applied to the coding unit 16, the data storage apparatus 10 may receive a command related to setting of the coding policy. That is, in this case, the control unit 14 decodes the input command and outputs at least one of the internal read signal, the internal trigger signal and a coding policy change signal according to the decoding results. Further, the coding unit 16 receives the coding policy change signal from the control unit 14 and changes the coding policy.

That is, after power is applied to the data storage apparatus 10, the coding policy list is loaded and an external command is inputted to set one of the coding policies included in the coding policy list. Then, the coding unit 16 generates the mode determination data based on the ratio of the correctable coding of the set coding policy.

Figure 5:
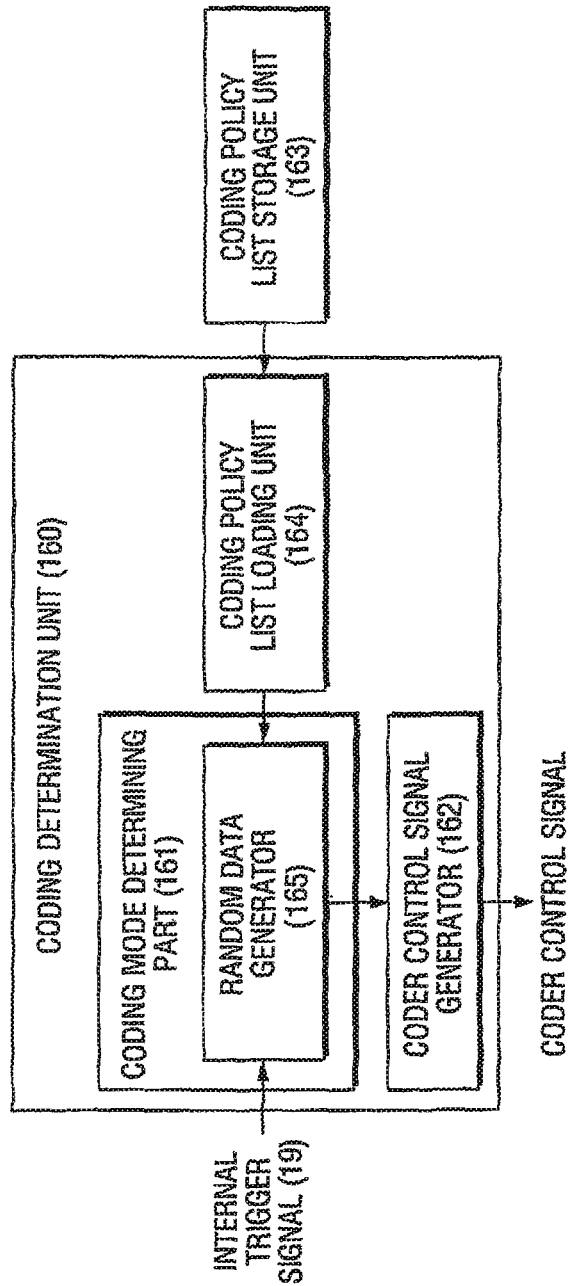
FIG. 5 is a block diagram of a coding determination unit of the data storage apparatus in accordance with an embodiment.

As shown in FIG. 5, the coding policy list storage unit 163 may be separately provided outside the coding determination unit 160. For example, the coding policy list storage unit 163 may be an E-fuse block that is a specific block of the memory unit 12. Also, the coding policy list storage unit 163 may be an E-fuse block provided separately from the memory unit 12 in the data storage apparatus 10. After power is applied to the data storage apparatus 10, an initial read operation is performed on the coding policy data stored in the E-fuse block. The coding policy data read by the initial read operation may be loaded in the coding policy list loading unit 164.

Since the data stored in the E-fuse block may be updated in an E-fuse data loading mode, the coding policy data can be also updated. Namely, the coding policy storage unit 163 may be any programmable device and the coding policy or policies stored therein may be programmable based on user input.

When the internal trigger signal 19 is inputted, the coding mode determining part 161 activates a random data generator 165 to generate random data based on a ratio of the set coding policy. That is, the random data generator 165 may generate random data such that a value indicating a coding mode for correctable coding the data is generated at a ratio defined by the coding policy. The random data generator 165 generates the mode determination data once if the internal trigger signal 19 is inputted once. The random data generator 165 may be a hardware implementation, a processor programmed with a random number generation algorithm, etc.

If there are coding mode A and coding mode B, one of the coding mode A and the coding mode B may be selected. For example, if a '0' is generated, the coding mode A is selected; and if '1' is generated, coding mode B is selected.

Then, the coder control signal generator 162 generates and outputs a coder control signal for controlling the coder 168 according to the mode determination data.

A method in which the coding determination unit 160 determines the coding mode of the coder by random data generation will be further explained.

As described above, generating the mode determination data based on the coding policy may be performed by generating random data such that a value indicating a coding mode for correctable coding the data is generated at a specific probability. The random data generated by the coding determination unit 160 is referred to as "first random data" for convenience of explanation.

Although the coding determination unit 160 receives the internal trigger signal 19 the same number of times at equal intervals, the data used to determine the coding mode of the coder 168 is the first random data. Accordingly, in the characteristics of generating the random data, whether specific data stored at a specific address is correctably coded may vary every read operation. Namely, a region of the data outputted from the data storage apparatus 10 in which the data is correctably coded may be changed every read operation. In other words, since the output data of specific data stored at a specific region in the data storage apparatus 10 may be changed every read operation, it makes it difficult for a hacker to recognize whether some data can be corrected. Accordingly, in the data storage apparatus 10 of this embodiment, since the coding determination unit 160 determines the coding mode of the coder 168 based on the first random data, it is possible to vary a position of a region of the coding target data 20 in which the data is correctably coded.

The random data generator 165 generating the first random data may be programmable such that the probability of generating specific data (e.g., indicating a specific coding mode) is programmable.

Hereinafter, the configuration of the coder 168 will be described with reference to FIGS. 8 to 13.

Figure 8:
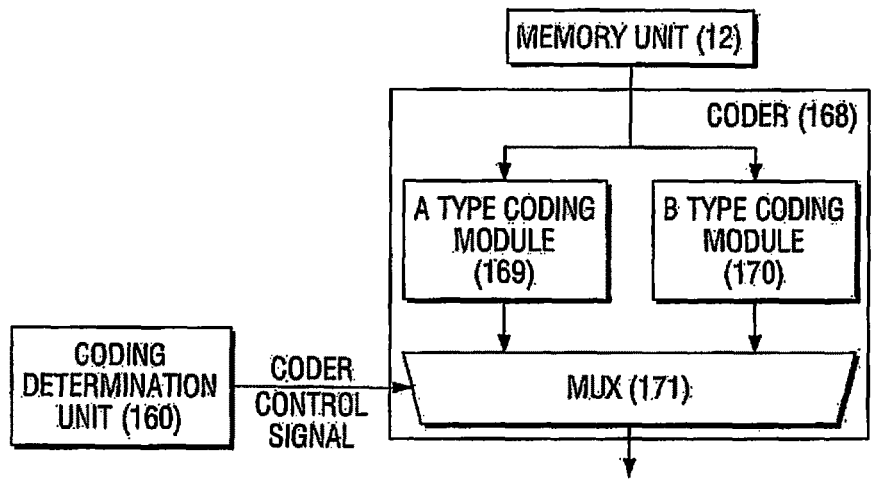
FIGS. 8 to 13 explain configuration examples of a coder in accordance with an embodiment.

First, the coder 168 may include a plurality of coding modules for coding the data provided from the memory unit 12. FIG. 8 illustrates an example of the coder 168 including two coding modules 169 and 170. The data outputted from the memory unit 12 is provided to the two coding modules 169 and 170. Only one of the two coding modules 169 and 170 is enabled according to the coder control signal provided from the coding determination unit 160. Then, the coded data provided from the coding module that has been enabled is outputted through a MUX 171. In this case, the coding modules perform coding on the input data at different coding ratios. The coding ratio of each coding module 169, 170 may be programmable based on user input. Namely, a user may vary the coding ratio of one or more of the coding modules 169, 170. Also, the coder 168 may be configured to turn power off to the unselected one of the coding modules 169, 170. Although the MUX 171 is located at the downstream side of the coding modules in FIG. 8, the MUX 171 may be located between the memory unit 12 and the coding modules.

The plurality of coding modules may include one or more A type coding modules for coding the input data at a ratio equal to or lower than the correctability limit ratio of the host or the controller, and one or more B type coding modules for coding the input data at a ratio higher than the correctability limit ratio. For example, if the correctability limit ratio of the host apparatus or the controller is 30%, the coding module 169 may be an A type coding module for coding 20% of the data and the coding module 170 may be a B type coding module for coding 70% of the data.

That is, the coder 168 shown in FIG. 8 codes and outputs the data using one of the A type coding module and the B type coding module under control of the coding determination unit 160.

Figure 9:
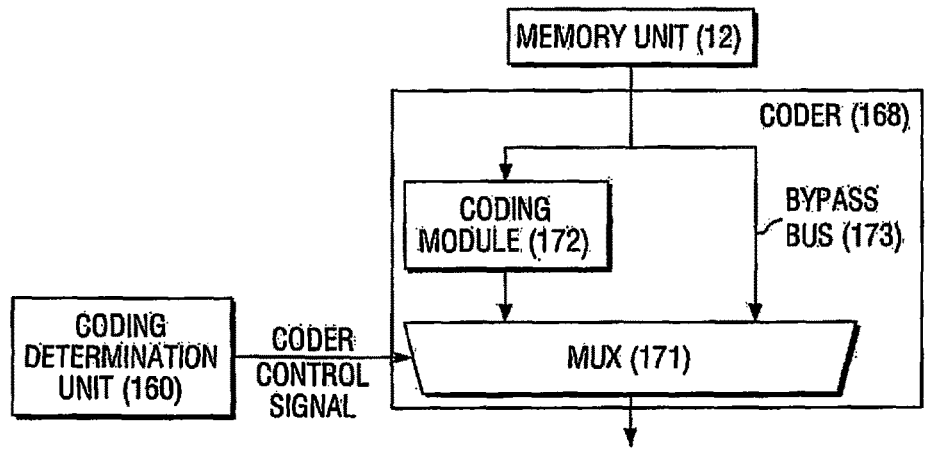

FIG. 9 illustrates the coder 168 which performs coding on the data provided from the memory unit 12 or outputs the data to bypass the coder under control of the coding determination unit 160. The coder 168 shown in FIG. 9 includes a coding module 172 for coding the input data and a bypass bus 173 for outputting the data provided from the memory unit 12 to the MUX 171. The coder 168 activates one of the coding module 172 and the bypass bus 173 under control of the coding determination unit 160 according to the determined coding mode. For example, the coding module 172 may perform coding the data provided from the memory unit 12. The coding ratio of the coding module 172 may be variously set within a range higher the correctability limit ratio. The coding ratio of the coding module 172 may be programmable based on user input. Namely, a user may vary the coding ratio of the coding modules 172. Also, the coder 168 may be configured to turn power off to the coding module 172 when the coding module 172 is not selected.

The coder 168 shown in FIG. 9 may perform coding on the data provided from the memory unit 12 or output the data with no coding by bypassing the coder under control of the coding determination unit 160.

Although the MUX 171 is located at the downstream side of the coding module 172 in FIG. 9, the MUX 171 may be located between the memory unit 12 and the coding module 172.

Figure 10:
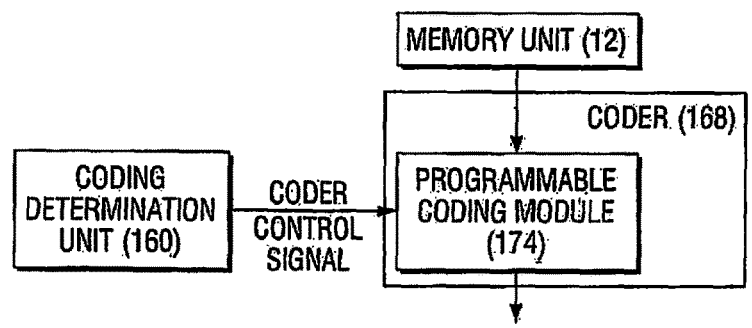

Meanwhile, the coder 168 may include one programmable coding module instead of the plurality of coding modules. FIG. 10 illustrates the coder 168 having a programmable coding module 174. The programmable coding module 174 may set a coding ratio of the input data.

The coder 168 shown in FIG. 10 sets a coding ratio of the programmable coding module 174 under control of the coding determination unit 160 according to the determined coding mode. The coder 168 shown in FIG. 10 also may switch the coding mode between a coding mode for correctable coding the data and a coding mode for non-correctable coding the data. That is, the coder 168 may set a coding ratio of the programmable coding module 174 at a first coding ratio equal to or lower than the correctability limit ratio in the first coding mode, or may set a coding ratio of the programmable coding module 174 at a second coding ratio higher than the correctability limit ratio in the second coding mode. The coder 168 may be user programmable to set the programming ratios used in configuring the programmable coding module 174 for the different coding modes.

Figure 11:
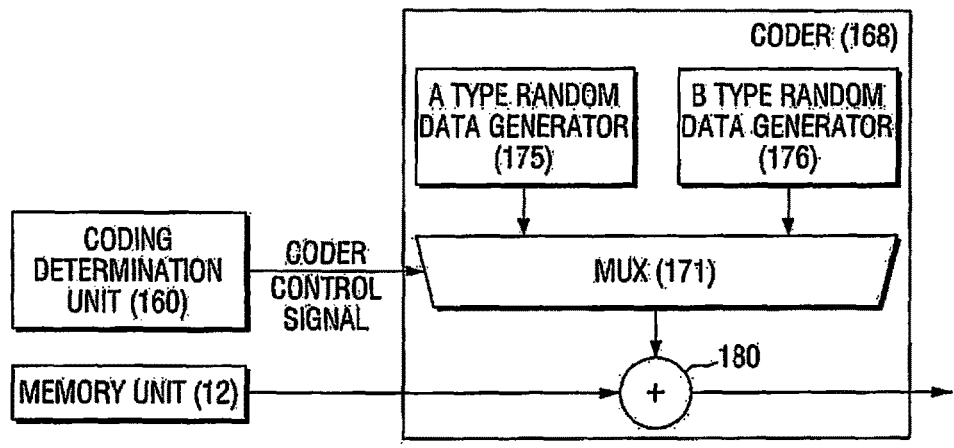

The coder 168 in accordance with an embodiment may include a plurality of random data generators instead of the plurality of the coding modules 169 and 170. FIG. 11 illustrates an example of the coder 168 including two random data generators 175 and 176. Only one of the two random data generators 175 and 176 is enabled according to the coder control signal provided from the coding determination unit 160. Then, the coder 168 outputs the results of logical operation 180 of the data provided from the random data generator that has been enabled and the data provided from the memory unit 12. A plurality of random data generators has different probabilities of generating an operand that maintains the data from the memory unit 12 after performing the logical operation. The logical operation may include AND, OR, XOR, NOR, NAND operations, a combination thereof, or etc.

An operand that maintains the data means data having a value that keeps the value of the data from the memory unit 12 after performing the logical operation. For example, if the operand maintaining data is "E" and the logical operation is XOR, "A XOR E=A" is obtained for any operand A.

In other words, in a case where a probability of generating operand maintaining data in the random data generator 175 or 176 in an ON state is X %, X % of the data outputted from the coder 168 may be the same as original data from the memory unit 12, and (100–X) % of the data outputted from the coder 168 may be different from original data from the memory unit 12. Accordingly, it can be understood that a probability of generating operand maintaining data for the logical operation 180 is related to a coding ratio. The coding ratio of produced by each random data generators 175, 176 may be programmable based on user input. Namely, a user may vary the coding ratio produced by one or more of the random data generators 175, 176.

The plurality of random data generators may include one or more A type random data generators for generating the operand maintaining data from the input data at a ratio higher than the correctability limit ratio, and one or more B type random data generators for generating the operand maintaining data from the input data at a ratio equal to or lower than the correctability limit ratio. That is, the plurality of random data generators may be classified into the A type for correctably coding the data and the B type for non-correctably coding the data.

Figure 12:
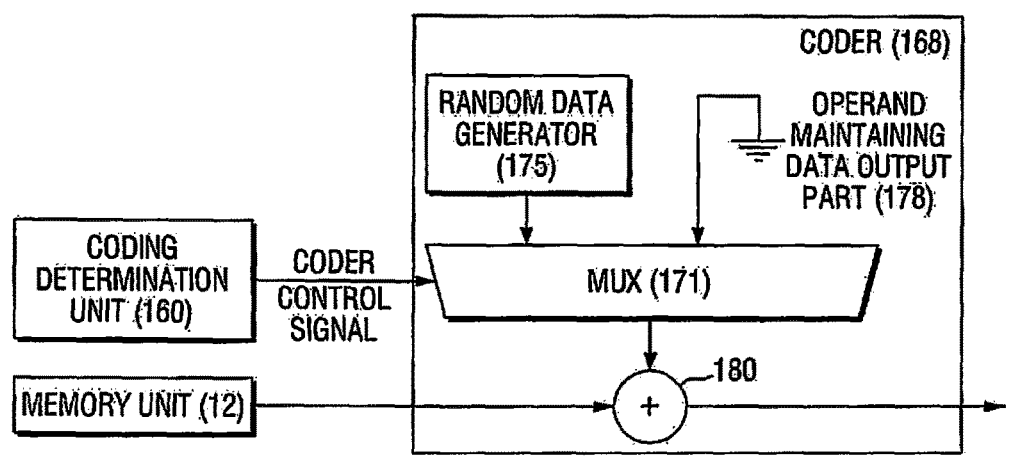

As shown in FIG. 12, the coder 168 may include the A type random data generator 175 and an operand maintaining data output part 178. The coder 168 may perform a logical operation on the data provided from the memory unit 12 and the data provided from one of the A type random data generator 175 and the operand maintaining data output part 178 under control of the coding determination unit 160 according to the determined coding mode, and output the results of the logical operation. The coder 168 shown in FIG. 12 codes the data provided from the memory unit 12 or outputs the data to bypass the coder under control of the coding determination unit 160 in the same way as in the coder 168 shown in FIG. 9. Alternatively the coder 168 in FIG. 12 may have a bypass bus, instead of having the operand maintaining data output part 178, by which the data from the memory unit 12 is outputted without the logical operation. The random data generator 175 may be user programmable to generate random data producing a particular coding mode or amount of coding. And, the random data generator 175 may be turned off when not selected.

Figure 13:
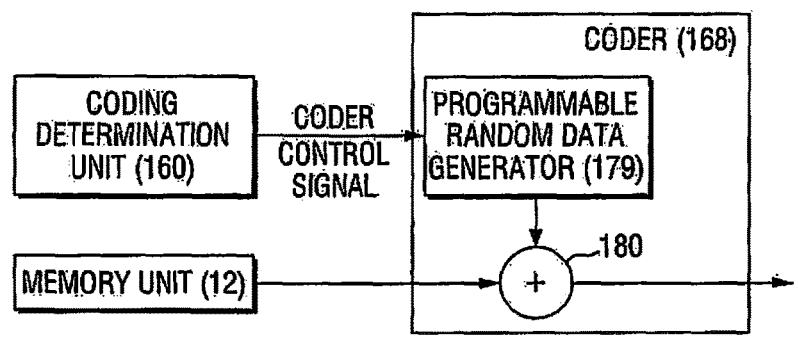

As shown in FIG. 13, the coder 168 may include a programmable random data generator 179 to set a probability of generating the operand maintaining data for a specific logical operation. The coder 168 may set the probability of generating the operand maintaining data of the programmable random data generator 179 according to the determined coding mode, and output the results of the specific logical operation 180 of the data provided from the memory unit 12 and the data provided from the programmable random data generator 179.

The coder 168 shown in FIG. 13 may switch the coding mode between a coding mode for correctably coding the data and a coding mode for non-correctably coding the data in the same way as the coder 168 shown in FIG. 10. That is, the coder 168 may set the probability of generating the operand maintaining data of the programmable random data generator at a first coding ratio higher than the correctability limit ratio in the first coding mode, or may set the probability of generating the operand maintaining data of the programmable random data generator at a second coding ratio equal to or lower than the correctability limit ratio in the second coding mode. The coder 168 may be user programmable to set the programming ratios used in configuring the programmable random data generator 179 for the different coding modes.

The coder 168 shown in FIGS. 8 to 13 has been illustrated as an example, and the coder 168 may be configured as a desired (or, alternatively a predetermined) scramble logic circuit.

The data storage apparatus 10 of this embodiment may receive the first command and the second command alternately to output the coding target data 20. In this case, the data storage apparatus 10 may receive a trigger command as the second command every time for a desired (or, alternatively a predetermined) size of the data to be outputted, or may receive the second command a desired (or, alternatively a predetermined) number of times to output all of the coding target data 20.

The data storage apparatus 10 of this embodiment may receive the third command two or more times to output the coding target data 20. In this case, the data storage apparatus 10 may receive the third command every time for a desired (or, alternatively a predetermined) size of the data, or may receive the third command a desired (or, alternatively a predetermined) number of times equal to the number of triggers to output all of the coding target data 20.

Hereinafter, the operation of the data storage apparatus 10 which receives the first command and the second command alternately to output a part of the coding target data 20 will be described in detail with reference to FIGS. 14 to 18.

To describe the first command and second command again, the first command is similar to a conventional read command in that it is decoded by the control unit 14 and transmitted to the memory unit 12 in the form of the internal read signal 18, and the second command is decoded by the control unit 14 and transmitted to the coding unit 16 in the form of the internal trigger signal 19.

The data storage apparatus 10, particularly, the control unit 14 receives the first command and the second command alternately. That is, after the first command is inputted, the second command is inputted, and after the second command is inputted, the first command is inputted. However, it is preferable that the control unit 14 receives the first command finally while the coding target data 20 is outputted. If the final command is the second command, the input of the second command is meaningless because there is no more remaining output data.

The control unit 14 may receive the second command initially. For example, the control unit 14 may receive the second command, the first command, the second command and the first command sequentially and alternately. The control unit 14 also may receive the first command initially. For example, the control unit 14 may receive the first command, the second command and the first command sequentially and alternately.

In brief, the control unit 14, while the coding target data 20 is outputted, may receive the second command and the first command alternately such that the second command or the first command is an initial command and, preferably, the first command is a final command.

Figure 14:
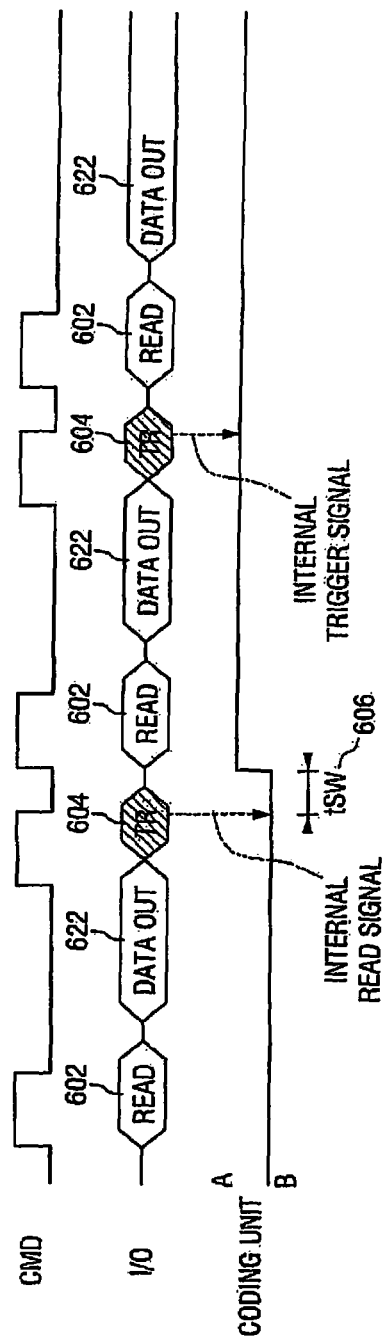
FIG. 14 is a timing diagram for explaining an operation of the data storage apparatus which alternately receives a first command READ and a second command TR in accordance with an embodiment.

FIG. 14 is a timing diagram for explaining the operation of the data storage apparatus 10, which alternately receives a first command READ and a second command TR.

After the data output 622 has been completed according to the immediately previous first command 602, the second command 604 is inputted through the I/O pin. In response to the input of the second command 604, the control unit 14 provides the internal trigger signal 19 to the coding unit 16, and the coding unit 16 autonomously determines the coding mode of the coding unit 16 according to the first random data for the next coding when the next first command 602 is inputted. In the autonomous determination, if it is determined that it is necessary to switch the coding mode of the coding unit 16, the time required for the coding unit 16 to complete the switching after receiving the internal trigger signal 19 is denoted by tSW 606.

As described above, the coding unit 16 may not switch the coding mode according to the mode determination data even though the second command 604 is inputted. In FIG. 14, the coding unit 16 switches the coding mode after the first input of the second command 604, whereas the coding unit 16 does not switch the coding mode after the second input of the second command 604.

Figure 15:
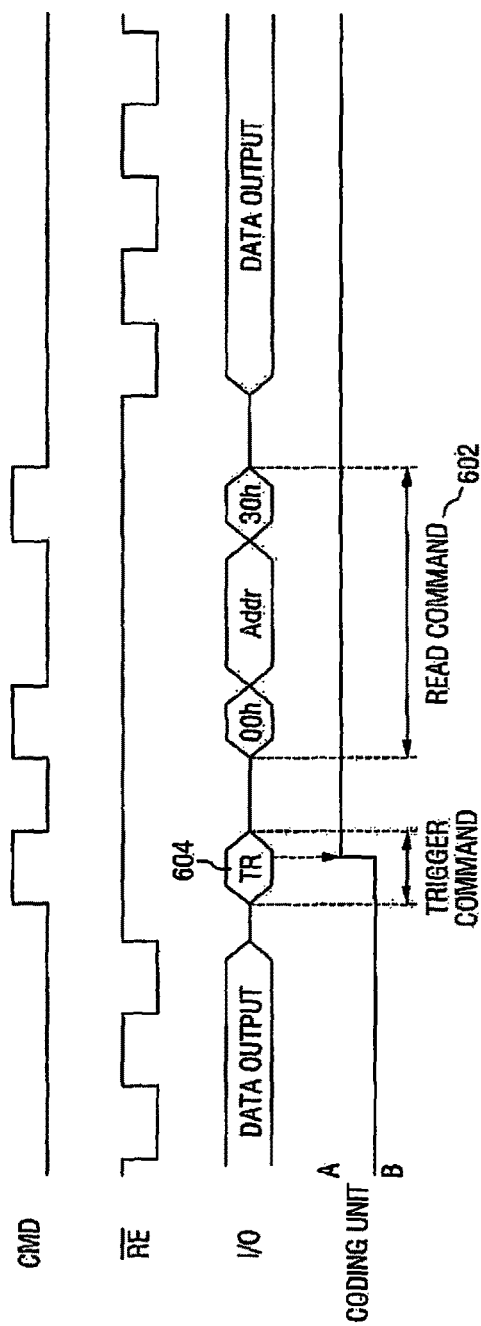
FIG. 15 is a detailed timing diagram for explaining the operation of the data storage apparatus which alternately receives the first command READ and the second command TR in accordance with an embodiment.

As shown in FIG. 15, the first command 602 may have two cycles. That is, the first command 602 may include a read start command 00h and a read confirm command 30h. Further, address information of the data to be outputted may be included between the read start command and the read confirm command. The address for the data which is outputted from the data storage apparatus 10 in response to the input of the first command 602 is increased as a signal of the read enablement (RE) pin is toggled.

Figure 16:
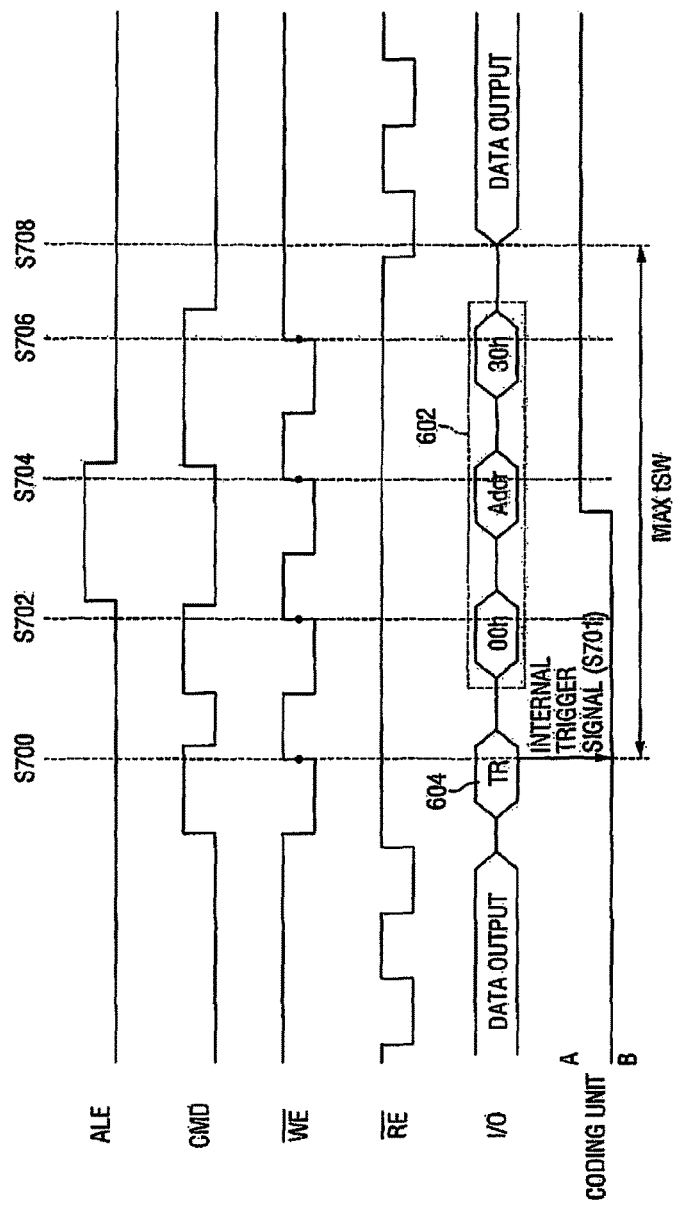
FIG. 16 is a detailed timing diagram for explaining a maximum allowable time of a switching operation of a coding unit in the data storage apparatus which alternately receives the first command READ and the second command TR in accordance with an embodiment.

FIG. 16 is a timing diagram for explaining a maximum allowable time of the switching operation of the coding unit in the data storage apparatus which alternately receives the first command READ and the second command TR in accordance with an embodiment.

The command inputted through the I/O pins of the data storage apparatus 10 is latched when the write enablement (WE) signal goes to high. As determined in the flash memory chip, the type of data inputted through the I/O pin when the WE signal goes to high can be perceived by the signal state applied to a command latch pin CMD and an address latch pin ALE.

As show in FIG. 16, after the data output has been completed in response to the input of the immediately previous first command, the second command inputted through the I/O pins is inputted at a rising edge of /WE signal (S700). In this case, the control unit 14 provides the internal trigger signal 19 to the coding unit 16 (S701). Then, the command 00h, the address, the command 30h are sequentially inputted at timings determined in the flash memory chip at a corresponding rising edge of/WE signal S702, S704, and S706. Then, the data output according to the first command 602 is performed. It is preferable that the switching operation of the coding unit 16 is performed before the data output is performed in response to the input of the next first command 602 after the input of the second command 604. That is, the maximum allowable time MAX tSW of the tSW 606 is a time period between a time point of S700 and a time point of S708.

As shown in FIG. 16, it can be seen that sufficient time can be ensured before the switching operation of the coding unit 16 is performed.

Figure 17:
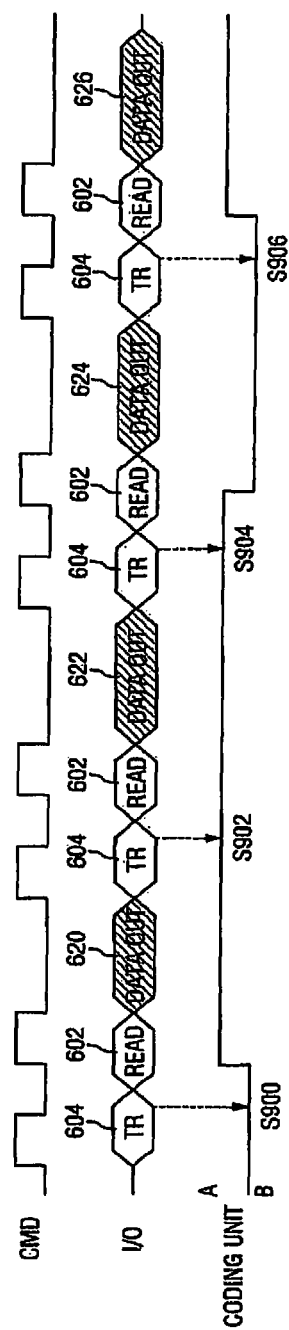
FIG. 17 is a timing diagram for explaining the operation of the data storage apparatus which alternately receives the first command READ for outputting fragments of the coding target data having the same size and the second command TR in accordance with an embodiment.

FIG. 17 is a timing diagram for explaining the operation of the data storage apparatus 10 which alternately receives the first command READ for outputting fragments of the coding target data having the same size and the second command TR in accordance with an embodiment.

As shown in FIG. 17, coding target data fragments 620, 622, 624 and 626 outputted from the memory unit 12 according to the first command 602 may have the same size. The coding target data fragment outputted from the memory unit 12 by the final first command 602 may have a different size from other coding target data fragments because the remaining data for the data output is finally outputted.

That is, the second command 604 may be inputted at regular address intervals. It can be seen that the coding mode of the coding unit 16 is switched from a B state to an A state in the first input of the second command (S900), but the coding unit 16 does not switch the coding mode in the second input of the second command (S902) and the third input of the second command (S904). The coding unit 16 switches the coding mode again in the fourth input of the second command (S906). As described above, in a case where the data is outputted again according to the request for a re-read operation of the coding target data stored in the same region, the coding unit 16 may switch the coding mode differently from FIG. 17.

Figure 18:
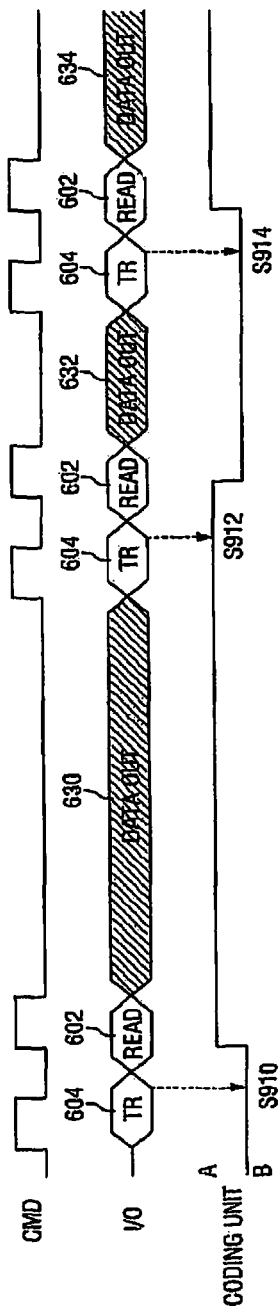
FIG. 18 is a timing diagram for explaining the operation of the data storage apparatus which alternately receives the first command READ for outputting fragments of the coding target data having different sizes and the second command TR in accordance with an embodiment.

As shown in FIG. 18, the data storage apparatus 10 may alternately receive the second command 604 and the first command 602 for outputting fragments of the coding target data 20 having different sizes. The sizes of the coding target data fragments 630, 632 and 634 outputted from the memory unit 12 according to the first command 602 may be different from each other. FIG. 18 illustrates a case where the coding unit 16 switches the coding mode in all of the first input of the second command (S910), the second input of the second command (S912), and the third input of the second command (S914). The coding mode switching cases shown in FIG. 18 may be different every time according to the coding mode autonomously determined by the coding unit 16.

As described above, the data storage apparatus 10 may or may not switch the coding mode of the coding unit 16 upon receipt of the second command or the third command. However, in order to switch the coding mode of the coding unit 16, the second command or the third command are be inputted. Further, the data storage apparatus 10 switches the coding mode of the coding unit 16 at least one time while the coding target data is outputted according to the read request inputted from the host apparatus 60. The data storage apparatus 10 in accordance with at least embodiment may perform a function of outputting coded data by performing the above-described operation. Further, switching between a coding mode is performed by the second command or the third command inputted from the outside. Accordingly, it is possible to prevent a part of the data from being abnormally coded or being outputted without being coded due to delay in switching between the coding mode.

Hereinafter, the operation of the data storage apparatus 10 which receives the third command two or more times to output the coding target data 20 will be described with reference to FIGS. 19 and 20.

The control unit 14 outputs the internal read signal 18 and the internal trigger signal 19 upon receipt of the third command 606. Accordingly, it can be understood that the third command 606 is a command formed by combination of the first command 602 and the second command 604.

Figure 19:
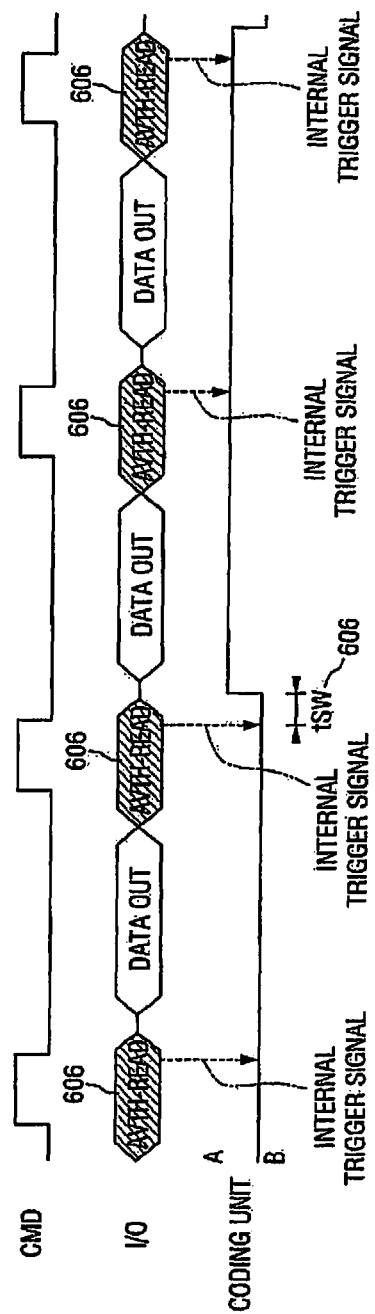
FIG. 19 is a timing diagram for explaining the operation of the data storage apparatus which receives a third command AUTH_READ a plurality of times sequentially in accordance with an embodiment.

FIG. 19 illustrates a case where the third command 606 does not include the address information. Although the address information is not included in the third command 606, in order to output the fragments of the coding target data 20, the data storage apparatus 10 may be operated to output the data having a desired (or, alternatively a predetermined) size in response to the input of the third command 606. Alternatively, the data storage apparatus 10 may be operated to resume the data output from the immediately previous output end point in response to the input of the third command 606 and temporarily stop the data output in the next input of the third command 606.

The data storage apparatus 10 performs an operation for determining the coding mode of the coding unit 16 and an operation for preparing the data to be outputted from the memory unit 12 in response to the input of the third command 606. The data is actually outputted from memory unit 12 at a time point when a signal of the read enablement (RE) pin is toggled (see FIG. 16).

Accordingly, there is a time difference between a time point when the internal trigger signal 19 is transmitted to the coding unit 16 in response to the input of the third command 606 and a time point when the data is outputted from the memory unit 12 in response to the input of the third command 606. Accordingly, the coding unit may support the output of the coded or non-coded data according to the coding mode of the coding unit 16 determined in response to the input of the third command 606 if the mode has been switched to the coding mode autonomously determined according to the internal trigger signal 19 before the data is outputted from the memory unit according to the internal read signal 18 provided together with the internal trigger signal 19.

Figure 20:
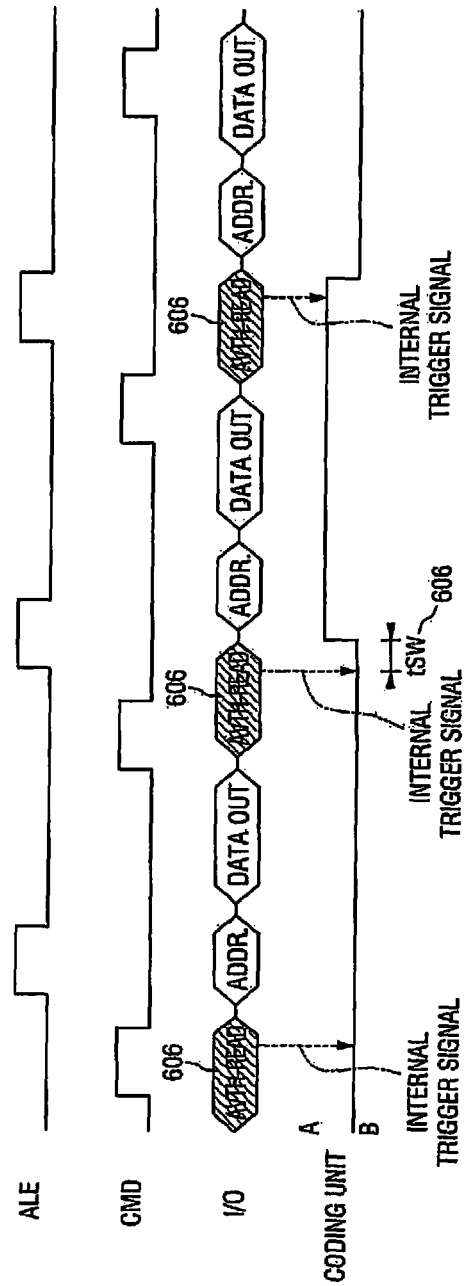
FIG. 20 is a timing diagram for explaining the operation of the data storage apparatus which receives the third command AUTH_READ and address information a plurality of times sequentially in accordance with an embodiment.

FIG. 20 illustrates a case in which an address of the data to be outputted is separately inputted after the input of the third command 606 differently from the case of FIG. 19. The input of the command and the input of the address are distinguished from each other by the signal state applied to the command latch terminal and the address latch terminal. In this case, the data storage apparatus 10 outputs only the data corresponding to the address information inputted separately after the input of the third command 606.

Hereinafter, a configuration of a data storage system 50 in accordance with various embodiments will be described with reference to FIGS. 21 to 23. The data storage system 50 of this embodiment includes the controller 40 for outputting a command in response to a read request for the coding target data inputted from an external device, and the data storage apparatus 10 which operates in response to the command inputted from the controller 40.

The data storage system 50 may be a card such as a memory card. Particularly, the data storage system 50 of this embodiment may be a card used to meet the industrial standards in an electric device such as a mobile phone, a two-way communication system, a one-way pager, a two-way pager, a personal communication system, a portable computer, a personal data assistant (PDA), an audio and/or video player, a digital and/or video camera, a navigation system, a global positioning system (GPS), or the like. However, it is not limited thereto, and the data storage system in accordance with the embodiment may be configured in various forms such as a memory stick.

First, the operation of the data storage system 50 in accordance with the embodiment will be described with reference to FIG. 21.

The controller 40 of the data storage system 50 of this embodiment generates the third command 606 in response to a read request for a part of the coding target data 20. Since the read request is made to read a part of the coding target data 20, the controller 40 needs to receive the read request two or more times to output all of the coding target data 20. The data storage apparatus 10 generates the mode determination data related to coding of the data to be outputted in response to the input of the third command 606. Then, the data storage apparatus 10 codes and outputs a part of the coding target data 20 according to the coding mode determined based on the mode determination data. Since the operation of the data storage apparatus 10 according to the third command 606 has been described, a description thereof will be omitted to avoid the repetition.

If the read request includes a trigger type, the controller 40 may generate the third command 606 including the trigger type. In this case, as described above, the data storage apparatus 10 autonomously determines whether to code the data in response to the input of the third command 606 according to the coding policy corresponding to the trigger type. Even though the trigger type is not included in the read request, the controller 40 can generate the third command 606 including the trigger type determined according to a storage position of the coding target data 20.

Hereinafter, the operation of the data storage system 50 in accordance with another embodiment will be described with reference to FIGS. 22 and 23.

Figure 21:
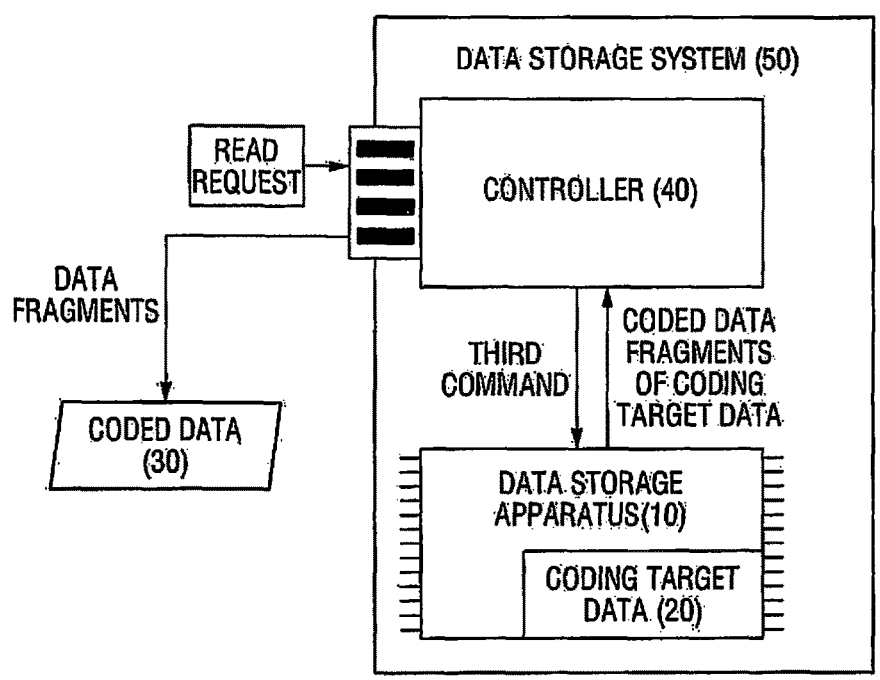
FIG. 21 is a diagram for explaining the configuration and operation of a data storage system including a controller and a data storage apparatus in accordance with an embodiment.

The data storage system 50 of this embodiment is different from the data storage system shown in FIG. 21 in that only one read request is required to be inputted to the controller 40 in order to output all of the coding target data 20.

Figure 22:
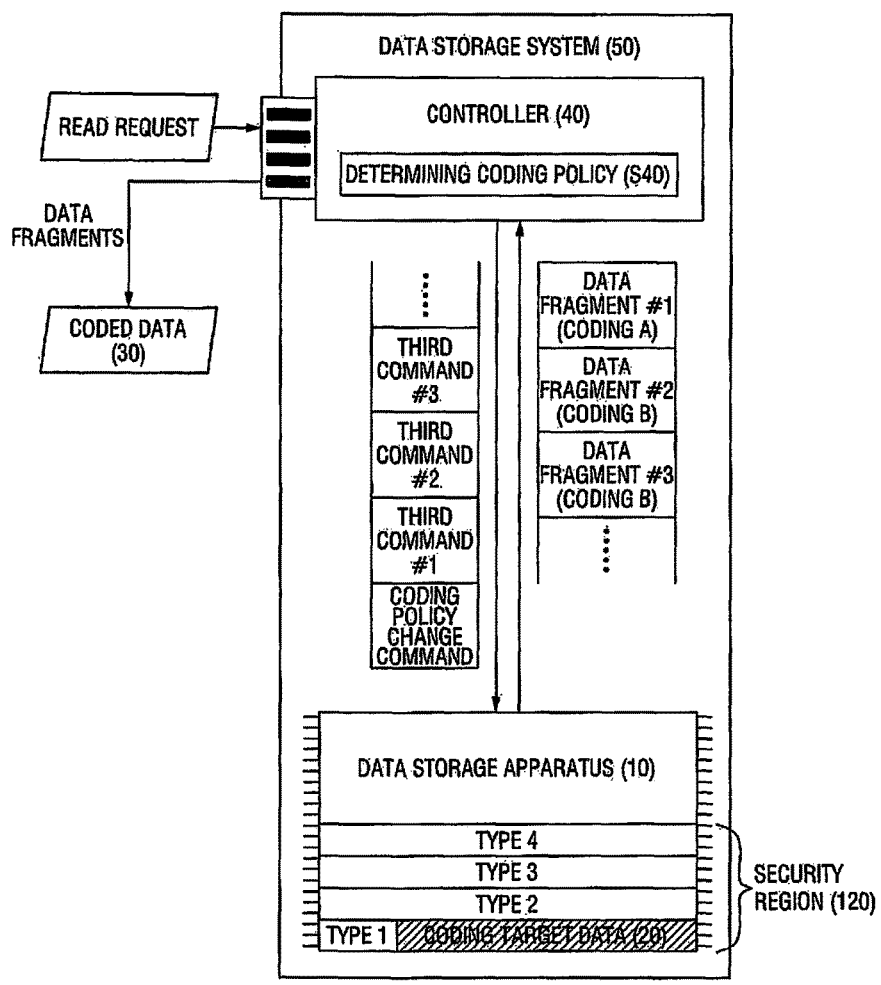
FIG. 22 is a diagram for explaining the configuration and operation of a data storage system including a controller and a data storage apparatus in accordance with another embodiment.

First, in the data storage system 50 shown in FIG. 22, the controller 40 outputs the third command 606 for outputting the fragments of the coding target data 20 two or more times sequentially in response to one input of the read request. For example, as shown in FIG. 22, the third command 606 for outputting the data fragments may be a command for outputting data having a size of 10 KB (Kilo Byte) each time. In response to the input of the third command 606 for outputting the data fragments, the data storage apparatus 10 autonomously determines the coding mode and codes and outputs the fragments of the coding target data 20 according to the determined coding mode, as described above.

The information on the coding policy applied when the data storage apparatus 10 autonomously determines whether to code the data may be included in the read request. Further, the controller 40 may provide the command for changing the coding policy to the data storage apparatus 10 in order to set or change the coding policy separately from the read request.

Although the coding policy is not included in the read request, the coding policy is determined according to a storage region of the coding target data 20 (S40), and the coding target data is coded according to the determined coding policy. As shown in FIG. 22, if the coding target data 20 is stored in a region to which the coding policy of type 1 is applied, the controller 40 may determine the coding policy as type 1 even through the read request does not include the information on the coding policy.

Figure 23:
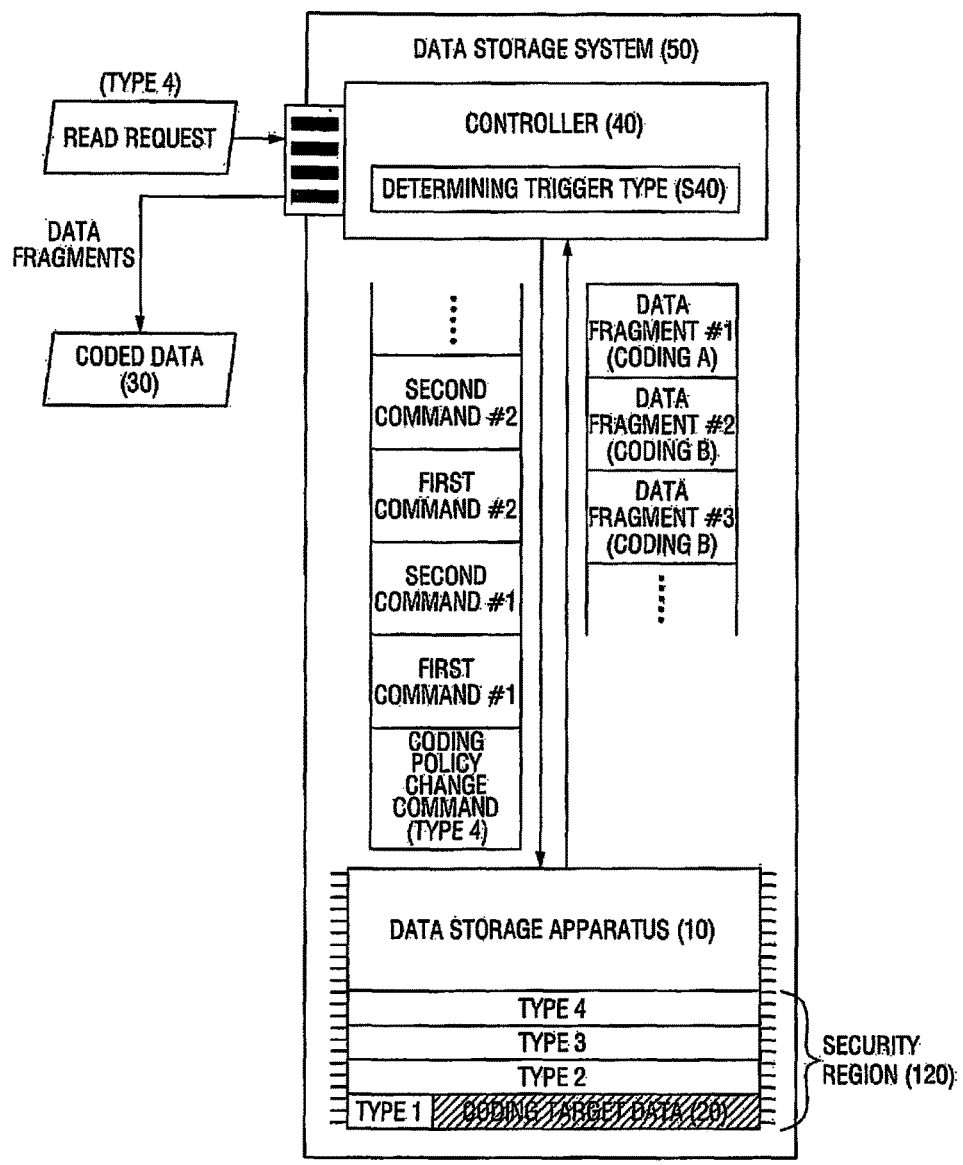
FIG. 23 is a diagram for explaining the configuration and operation of a data storage system including a controller and a data storage apparatus in accordance with still another embodiment.

Next, in the data storage system 50 shown in FIG. 23, the controller 40 alternately outputs the second command and the first command for outputting fragments of the coding target data in response to the input of the read request for the coding target data.

As shown in FIG. 23, the controller 40 outputs the first command 602 for outputting fragments of the coding target data 20 having a size of 10 KB and the second command 604 alternately in response to the input of the read request.

When alternately receiving the first command 602 for outputting data fragments and the second command 604, the data storage apparatus 10 autonomously determines the coding mode in response to the second command 604 and codes and outputs the fragments of the coding target data 20 according to the determined coding mode, as described above.

According to the example embodiments, there is an effect of performing coding with enhanced security of data to be outputted only by inputting specific command(s) to the data storage apparatus two or more times while the data is outputted from the data storage apparatus.

Further, switching of the coding mode of the coding unit in the data storage apparatus is performed in response to the input of the specific command, and data output is not performed during the switching. Accordingly, there is an effect of sufficiently ensuring the time required for switching of the coding mode of the coding unit. Consequently, it is possible to prevent the data required to be non-correctably coded from being correctably coded and vice versa due to the coding mode switching of the coding unit during the data output.

Furthermore, the data storage apparatus may determine the coding mode of the coding unit in response to the input of the specific command according to a desired (or, alternatively a predetermined) coding policy, and the coding policy may be defined by an external device. Accordingly, a coding method can be defined by an external device.

Moreover, a position of the data that has been correctably coded in the data outputted from the data storage apparatus is different every time, and original data is not outputted. Accordingly, it is possible to prevent the output data from being decoded unfairly.

While the embodiments have been particularly shown and described, it will be understood by those of ordinary skill in the art that various changes in forms and details may be made therein without departing from the spirit and scope of the inventive concepts as defined by the following claims.

I claim:

1. A method of coding data, comprising:
varying, by at least one processor, coding ratios of coding modes, respectively, based on user input;
generating, by the processor, random data in response to a trigger signal, the trigger signal being a signal generated by decoding a data input command;
autonomously selecting, by the processor, a coding mode from among the coding modes based on the random data; and
producing, by the process, coded data by coding output data from a memory unit based on the selected coding mode.

2. The method of claim 1, wherein the selecting comprises:
configuring a random generator based on a coding policy, the coding policy indicating a probability of selecting each of a plurality of coding modes; and
randomly generating a coding mode indicator as the random data using the random generator, the coding mode indicator indicating one of the coding modes.

3. The method of claim 1, wherein at least one of the coding modes is a mode, which permits correct decoding of the coded data in a device that receives the coded data, and at least one of the coding modes is a mode, which does not permit correct decoding of the coded data in the device that receives the coded data.

4. A method of coding data, comprising:
generating, by at least one processor, random data which meets a coding policy in response to a trigger signal, the trigger signal being a signal generated by decoding a data input command, the coding policy indicating a probability of selecting each of a plurality of coding modes;
autonomously selecting, by the processor, a coding mode from the plurality of coding modes based on the random data; and
producing, by the processor, coded data by coding data output from a memory, according to the selected coding mode.

5. The method of claim 4, wherein the autonomously selecting and the producing are repeatedly performed with respect to a plurality of data.

6. The method of claim 4, further comprising:
setting the coding policy based on an input command.

7. The method of claim 6, further comprising:
setting a different coding policy as the coding policy in response a change command.

8. The method of claim 4, wherein further comprising:
setting the coding policy based on a location of the data in the memory.

9. The method of claim 8, further comprising:
setting a different coding policy as the coding policy in response a change command.

10. The method of claim 4, further comprising:
loading a list of coding policies including the coding policy from a coding policy storage unit; and
selecting the coding policy from the list.

11. The method of claim 10, further comprising:
setting a different coding policy from among the coding policies as the coding policy in response a change command.

12. The method of claim 4, wherein
the coding modes include a first coding mode and a second coding mode;
the coded data is correctly decodable in response to the autonomous selecting the first coding mode; and
the coded data is not correctly decodable in response to the autonomously selecting the second coding mode.

13. The method of claim 4, wherein the coding policy indicates a percentage at which the coding mode is selected.

14. The method of claim 12, wherein the selecting a coding mode includes,
configuring a random generator based on the coding policy; and
randomly generating a coding mode indicator as the random data using the random generator, the coding mode indicator indicating one of the first coding mode or the second coding mode.

15. The method of claim 4, further comprising:
setting a different coding policy as the coding policy in response a change command.

16. A method of coding, comprising:
dividing, by at least one processor, data into a plurality of data fragments, each of the data fragments having same data;
generating, by the processor, random data which meets a coding policy, the coding policy indicating a probability of selecting each of a plurality of coding modes;
autonomously selecting, by the processor, at least one of a first coding mode or a second coding mode from among the plurality of coding modes based on the random data; and
coding, by the processor, the data fragments into a plurality of sets of coded data fragments at a plurality of rounds, respectively, using the at least one of a first coding mode or a second coding mode, each of the sets of the coded data fragments including a pattern, the pattern including at least one of one or more first coded data fragments or one or more second coded data fragments, the first coded data fragments being data fragments coded by a first coding mode, the second coded data fragments being data fragments coded by a second coding mode, the first coded data fragments being data fragments coded less than the second coded data fragments, and the generating generates the plurality of sets of coded data fragments including a first set of coded data fragments and a second set of coded data fragments such that the pattern associated with the first set differs from the pattern associated with the second set.

17. The method of claim 16, wherein the first coded data fragments are correctly decodable, and the second coded data fragments are not correctly decodable.

18. The method of claim 17, wherein each pattern has at least one first coded data fragment.

19. The method of claim 16, wherein at least two sets of the sets of coded data fragments include a same number of the first coded data fragments.

20. The method of claim 19, further comprising:
obtaining the coding policy indicating a maximum number of the first coded data fragments.

* * * * *